Patented July 15, 1930

1,770,866

UNITED STATES PATENT OFFICE

STANLEY COCHRAN SMITH, OF LONDON, ENGLAND

TREATMENT OF NICKELIFEROUS MATERIAL

No Drawing. Application filed April 18, 1929, Serial No. 356,313, and in Great Britain April 18, 1928.

This invention relates to a treatment of ores, concentrates, residues and other materials in which the chief metal values are nickel and copper and particularly when these are associated with platinum and/or other precious metals.

It is to be understood that since cobalt behaves like nickel in the reactions involved in the invention, wherever nickel is named in the specification, the term includes cobalt, when this is present in the nickeliferous material.

This invention is based on the discovery that the metallic sponges produced by the reduction of the mixed oxides of copper and nickel as they occur, for example, in a roasted matte, can be dissolved easily and practically completely in dilute sulphuric acid with the aid of atmospheric oxidation, so far as the base metals are concerned, and further that, under this condition, the presence of a relatively high proportion of precious metal does not interfere with the dissolution of the base metals.

In using the word "sponge" I wish it to be understood to mean a finely subdivided product obtained by a reducing process which does not involve agglomeration of the subdivided particles by fusion. For instance, the finely subdivided material may be mixed with a suitable proportion of carbon and the mixture heated in a muffle furnace; or a suitable reducing gas or vapour may be passed over the material at a raised temperature. Whether in such a process of reduction all the reducible metallic oxides are reduced to metal or to some lower form of oxidation than the original form, is not of importance; there is always a certain proportion of metal present and the lower oxides, if there be any, evidently behave in the manner herein attributed to metals.

I have discovered that when a "sponge" containing nickel and copper is moistened with an acid and exposed to air, a rise of temperature occurs in the mass and compounds of nickel and copper are formed which can be leached from the mass by an acid. By repeated alternating exposure to air and leaching with acid substantially the whole of the nickel and copper can be extracted from the mass.

A convenient procedure consists in using the material consisting of or containing a sponge of copper and nickel as a percolation bed for dilute sulphuric acid. After the first percolation air is caused to follow the acid; there is a rise of temperature in the mass due to rapid oxidation, so that on the next percolation a further and considerable portion of the metals dissolves.

These alternate aerations and percolations permit of rapid extraction of all the copper and nickel from the mass.

In one mode of applying the invention the copper and nickel contents of ores, concentrates or residues, are first converted in known manner into the form of matte. The invention is applicable to the ferruginous matte as usually obtained in the first instance, but generally the so-called Bessemerized matte is preferable, in which the iron content is reduced to a minimum. The matte may be roasted in such a way as to leave as much as possible of the copper in a form soluble in dilute sulphuric acid; this roasted matte may then be leached with sulphuric acid to remove a large portion of the copper; the residue, which may be re-roasted, is then reduced to sponge.

Alternatively, the preliminary leaching step may be omitted and the de-sulphurized matte directly reduced to a sponge; in either case the reduction is carried out in the manner described above with careful regulation of the temperature during the reduction to avoid any considerable amount of sintering. The sponge thus produced is then treated with warm dilute sulphuric acid under the conditions named above, that is to say the sponge is spread in thin layers on a filtering medium so that it can be treated with acid and air in succession by percolation. In this manner practically the entire metal contents with the exception of any precious metals can be dissolved.

In certain cases, it is possible to avoid the preliminary steps of making a matte; for instance, when a complex nickel-copper ore is to be treated for the purpose of winning a solution containing nickel and copper. In this case it may suffice to oxidize the ore completely by roasting, and then reduce the copper and nickel contents to a form suitable for the application of this invention.

In the treatment of the nickel-copper sponge by percolation and aeration according to the invention, a liquor produced in the earlier stages constitutes a solution of substantially pure nickel sulphate, and that produced in the later stages a solution of substantially pure copper sulphate. Alternatively, the whole of the copper and nickel contents may be dissolved and then treated with an appropriate amount of the nickel-copper sponge, thereby obtaining a substantially pure nickel solution.

The invention has an advantage that, owing to the active nature of the metallic sponge, it is possible to use the exothermic nature of the reaction of the metal to furnish the heat necessary for accelerating the reaction. Where acid leaching liquors have to be heated, this is always an operation of considerable difficulty.

Since none of the precious metals, for example silver, gold or metals of the platinum group, which may originally be associated with the material to be treated, passes into solution at any stage of the process when sulphuric acid is used, the invention may be regarded as a means of separating metals of the platinum group and other precious metal content from nickeliferous materials. It may be added that lead, when present, may be expected to remain with the precious metals.

No mention has been made of the reactions of iron in the foregoing description because iron behaves like the nickel.

Hydrochloric acid may generally be substituted for sulphuric acid in the process, but this acid is apt to dissolve a small proportion of the precious metals, and care must be taken that, when the acid is used, the final leachings are treated with material rich in the base metals, whereby any precious metals which may have been dissolved are precipitated and returned to the process.

The following example illustrates the invention:—

*South African Norite.*—Platinum concentrates were smelted (in known manner) to a matte containing per cent:—

Cu_____ 21.65
Ni_____ 38.11
Fe_____ 18.18
Metals of the platinum group_____ 0.259

1000 kilos of this matte were ground to pass a sieve of 20 meshes to the inch and then introduced into a roasting furnace. The weight of the roasted material recovered was 914 kilos of the following assay per cent:—

Cu_____ 23.70
Ni_____ 41.60
Fe_____ 19.89
Metals of the platinum group_____ 0.283

The roasted product contained 0.25 per cent of sulphur.

The roasted product was then passed through a ball mill provided with screens of 10 meshes to the inch which discharged into cast iron reduction boxes provided with well fitting covers and inlet and outlet pipe connections at the opposite ends. Two boxes were each filled with 457 kilos of the roasted product. After closing the covers the boxes were introduced into a double muffle furnace and the inlet connections coupled by a flexible connection with a supply of coal gas. The temperature in the muffles was then allowed to rise from the initial figure of about 350° C. to 725° C. at which latter temperature the charges were maintained for 1 hour. The heat was then cut off and when the temperature had fallen to 375° C. the boxes were withdrawn from the muffles. A small amount of coal-gas was allowed to pass over the charge until the temperature had fallen below 120° C. when the gas was cut off and the boxes allowed to cool. The weight of reduced product so obtained was 730 kilos.

The product was then placed on vacuum filters and subjected to the following treatment:—Warm diluted sulphuric acid was run on to the beds which were approximately 5 inches in depth. The acid was allowed to be drawn through and then aeration of the bed allowed for about 20 minutes. The rise of temperature was most noticeable, particularly in the early stages when 130° C. was observed. Leaches were given for the first 24 hours with acid of 10 per cent strength, for the succeeding 12 hours of 15 per cent strength and for the final 12 hours of 20 per cent strength.

The earlier leaches gave a neutral liquor, the final leaches gave liquors testing up to 15 per cent of free acid, which latter was of course available for the treatment of further material. The residue finally obtained was dried and weighed 106 kilos and contained 2.45 per cent of metals of the platinum group.

This residue was given the same sequence of treatments a second time, that is, it was roasted, ground, reduced and leached in the same manner as before. The final dried product weighed 22 kilos of the following percentage assay:—

Cu_____ 36.5
Fe_____ 4.78
Ni_____ 19.84
S_____ 3.02
Metals of the platinum group_____ 11.70

It will be observed from the above that the base metals were extracted to the following extent:—

Cu ---------------------------- 90 per cent
Ni ---------------------------- 99 per cent while practically the whole of the precious metals was concentrated in the final residue.

The final residue containing over 3500 ozs. of precious metals to the ton was refined in known manner.

Having thus described the nature of the said invention and the best means I know of carrying the same into practical effect, I claim:—

1. A treatment of ores, concentrates, residues and other materials for extracting nickel and copper, wherein the material is first reduced in such a manner that the metals are in the form of sponge, and the nickel and copper are converted into compounds soluble in acid by moistening the reduced material with acid and exposing it to air until a rise of temperature occurs.

2. In the treatment referred to in claim 1, alternately leaching with acid and exposing to air the product obtained by the first exposure to air.

3. A process of concentrating precious metals in material containing in addition nickel and copper comprising reduction of the material to a condition in which its base metal contents are in the form of sponge and subjection of this sponge to repeated successive percolations by a suitable acid and by air, whereby base metals are dissolved from the material until the latter has acquired the desired percentage content of the precious metals.

4. A treatment of ores, concentrates, residues and other materials for extracting nickel and copper, comprising reducing the metals to sponge form, moistening such material with acid, exposing the material to air until a rise of temperature occurs, and alternately leaching the product with acid and exposing it to air, the same liquor being utilized for leaching the product until substantially the whole of the nickel has been extracted.

In testimony whereof I have signed my name to this specification.

STANLEY COCHRAN SMITH.